May 22, 1962     R. L. UPHOFF     3,036,299
CIRCUIT FOR DIGITIZING ANALOG QUANTITIES
Filed Sept. 10, 1959

INVENTOR
Russel L. Uphoff

BY *J.H. Munroy*

ATTORNEY

United States Patent Office 3,036,299
Patented May 22, 1962

3,036,299
CIRCUIT FOR DIGITIZING ANALOG QUANTITIES
Russel L. Uphoff, Murrysville, Pa., assignor to Jones & Laughlin Steel Corporation, Pittsburgh, Pa., a corporation of Pennsylvania
Filed Sept. 10, 1959, Ser. No. 839,180
6 Claims. (Cl. 340—347)

This invention relates to circuit apparatus for generating output pulses at a rate which is a linear function of an input in the analog form, and more particularly to apparatus of the type described which is essentially insensitive to temperature variations.

The present invention has as its principal object the provision of means for converting an electrical analog quantity such as a varying direct current voltage into a proportional digital quantity in the form of a pulsed signal having a pulse recurrence frequency which varies as a linear function of the magnitude of the direct current voltage applied thereto. Such apparatus has application, for example, where it is desired to convert variations in current or voltage amplitude into variations in frequency for either computational or read-out purposes. In contrast to the usual digital system in which information is contained as a number of digits, the present invention produces information in the form of pulse rate. This information is current at all times; and, hence, the invention may be readily used in conjunction with analog systems in which input information varies continuously.

As will become apparent from the following description, the invention consists in one embodiment of a free-running transistor blocking oscillator, the output frequency of which varies as a function of a variable electrical analog quantity. This analog quantity may be a varying current or a varying voltage. In general, however, it has been found that the invention is most useful when the input is a varying voltage.

Another object of the invention is to provide a transistor analog-to-digital converter which is essentially insensitive to temperature variations. As is well known, leakage current through transistors varies as a function of temperature; and, consequently, temperature variations might alter the linearity of a converter of the type described herein. Accordingly, the present invention includes means for compensating for such temperature variations whereby the linearity of the device is preserved. In one embodiment of the invention, temperature compensation is achieved by including in the circuit a Zener diode in combination with a silicon diode. Both of these elements are relatively insensitive to temperature variations and are included in the circuit in a manner such that they compensate for increases in transistor leakage current.

Still another object of the invention lies in the provision of a transistor circuit for converting analog information into digital information which is simple and economical in construction.

The above and other objects and features of the invention will become apparent from the following detailed description taken in connection with the accompanying drawings which form a part of this specification and in which.

Figure 1:
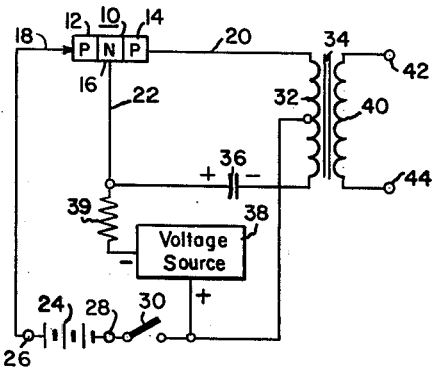
FIGURE 1 is a schematic circuit diagram of one embodiment of the invention employing a variable direct current voltage as the analog input quantity.

Referring to FIG. 1, the embodiment of the invention shown includes a PNP junction transistor 10 having an emitter 12, a collector 14 and a base 16. An input electrode 18 is connected to the emitter 12, an output electrode 20 is connected to the collector 14, and a control element 22 is connected to the base, substantially as shown. In accordance with well-known transistor theory, the PNP junction transistor 10 consists of a crystal of N-type germanium bounded by two P-type regions. The N-type germanium constitutes the base 16 of the transistor and the two P-type regions constitute the emitter 12 and collector 14. The junctions between the N-type and P-type germanium sections act as rectifiers. Very little, if any, current flows through the transistor when the N-type base is positive relative to the P-type emitter; whereas, a relatively large current flows when the N-type base is negative relative to the P-type emitter by as little as a fraction of a volt. The amount of current flowing through the transistor 10 is a function of temperature. That is, when the temperature increases, the amount of current increases likewise. Similarly, when temperature decreases, the amount of current also decreases.

Also included in the circuit of FIG. 1 is a source of direct current driving potential such as battery 24 having a pair of output terminals 26 and 28. The positive terminal 26 is connected to emitter 12; whereas, the negative terminal 28 is connected through switch 30 and the upper portion of the primary winding 32 of a transformer 34 to the collector 14. Collector 14 is also connected to base 16 through a current path including the primary winding 32 and a capacitor 36. An analog input quantity in the form of a variable direct current voltage source 38 is connected through resistor 39 to base 16 and through switch 30 to the negative terminal 28 of battery 24, the polarity of the voltage source being as indicated. Output pulses from the circuit appear across the secondary winding 40 of transformer 34 and are taken from output terminals 42 and 44. Although the primary winding 32 is shown herein as being tapped, it should be understood that the collector winding above the tap may be separated from the base winding below the tap. For best temperature stability, it has been found by experiment that the turns ratio of the base portion of winding 32 to the collector portion should be 4 to 1.

In operation, when switch 30 is initially closed, the transistor 10 will conduct to produce an output pulse across terminals 42 and 44 and charge capacitor 36 with the polarity shown. During the initial portion of the cycle, a regenerative action takes place. In this process the voltage produced across the lower portion of winding 32 drives base 16 negatively until the transistor saturates, at which time the induced voltage across the transformer winding begins to fall since the product L $di/dt$ drops to zero at saturation. This effect is enhanced by the regenerative action of the circuit causing the voltage on the lower portion of winding 32 to decrease rapidly until the transistor cuts off. Furthermore, the transistor will be held cut off by virtue of the accumulated charge on capacitor 36 due to the heavy flow of base current during the interval of transistor conduction. After a predetermined amount of time, however, capacitor 36 will discharge through a current path including the lower portion of primary winding 32 and voltage source 38. After capacitor 36 has discharged to the point where the voltage on the base 16 of transistor 10 reaches the cut-off value, the transistor will again conduct to produce a pulse across terminals 42 and 44, and the cycle is repeated.

Since capacitor 36 must discharge through voltage source 38, the magnitude of this voltage source obviously affects the discharge rate. Thus, if the magnitude of source 38 is increased, the discharge period is decreased and the time between successive output pulses appearing at terminals 42 and 44 is likewise decreased. Similarly, if the magnitude of source 38 is decreased, the time between successive output pulses is correspondingly increased. In this manner the pulse recurrence rate of the circuit varies as a function of the magnitude of source 38.

Figure 2:
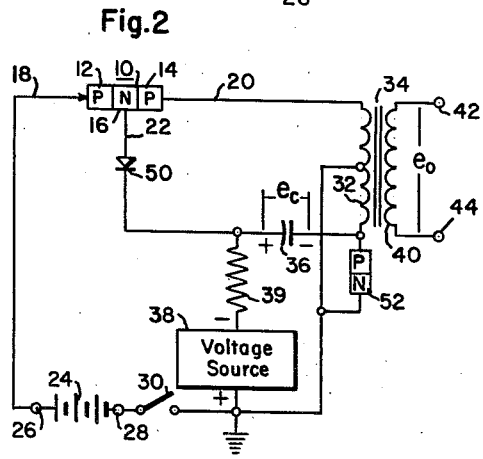
FIG. 2 is a schematic circuit diagram of another embodiment of the invention incorporating temperature compensation.

The circuit shown in FIG. 2 is similar to that shown in FIG. 1; and, accordingly, elements in FIG. 2 corresponding to those in FIG. 1 are identified by like reference numerals. This circuit, however, includes a silicon diode 50 connected between the base 16 and capacitor 36 and a Zener diode 52 connected in shunt with the lower portion of the primary winding 32 of transformer 34. It will be noted that the Zener diode 52 has its anode connected to capacitor 36 and its cathode connected to ground. The reverse current-voltage characteristic of a Zener diode of this type is such that as the reverse current is increased from zero, the voltage increases very rapidly until a voltage, called the Zener voltage, is reached. At this point the diode, in effect, breaks down; and the reverse voltage across the diode remains constant, becoming substantially independent of current.

As was the case with the embodiment of FIG. 1, the variable direct current voltage source 38 has its positive terminal connected to ground and its negative terminal connected to resistor 39. Thus, the capacitor 36 will discharge into voltage source 38 after it is initially charged through the lower half of winding 32, and the rate at which it discharges is dependent upon the value of voltage source 38.

Figure 3:
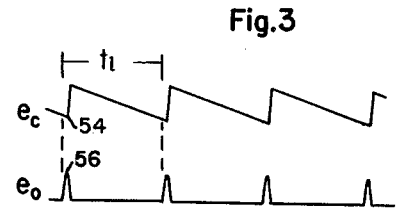
FIG. 3 illustrates wave forms appearing across various points of the circuit of FIG. 2.

In FIG. 3 it will be seen that the voltage across capacitor 36, $e_c$, increases very rapidly at point 54 while the capacitor charges. At the same time a voltage pulse 56 is produced across terminals 42 and 44. The transistor 10 then cuts off, and capacitor 36 discharges over a time interval $t_1$ determined by the value of voltage source 38 until the cut off voltage of the transistor is reached, and the cycle is repeated. It will be apparent that the period $t_1$ may be varied by changing the value of voltage source 38 and the discharge rate of capacitor 36. It has been found in actual practice that the pulse repetition frequency is a linear function of the value of voltage source 38, assuming that the voltage of this source is large compared to the base cut off voltage of transistor 10.

The transistor 10, of course, acts as a switch; and the back current of its base increases as temperature increases. In this manner the transistor provides a second discharge path for capacitor 36 as temperature increases through the base 16, collector 14 and the primary winding 32 of transformer 34. Such leakage current through the base will obviously affect the discharge rate of capacitor 36 and the linearity of the circuit. To prevent such a condition, the silicon diode 50 is included in the circuit which effectively blocks the second discharge path through the base 16 and collector 14. Zener diode 52 is also included in the circuit to compensate for temperature variations. As the temperature of the transistor increases, the current passing through its emitter and collector will also increase so that as the temperature increases, the amount of charge on capacitor 36 will also increase as well as the length of period $t_1$. By including Zener diode 52 in the circuit, however, and adjusting its breakdown voltage at the level to which capacitor 36 should be charged, the diode 52 will effectively short circuit the base winding 32 when the voltage increases above this value. Consequently, the Zener diode assures that the voltage applied to capacitor 36 will be substantially constant during each cycle regardless of temperature.

Figure 4:
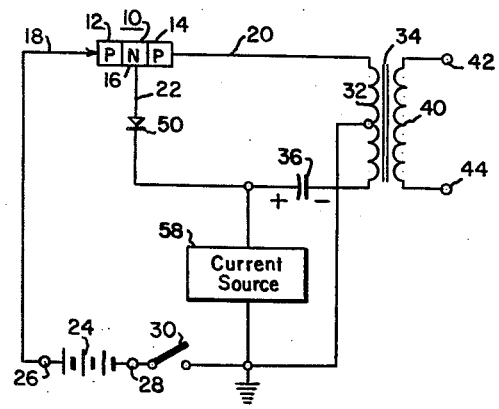
FIG. 4 is still another embodiment of the invention wherein the input analog quantity is a varying current.

In FIG. 4 still another embodiment of the invention is shown wherein the variable voltage source 38 is replaced by a source of variable current 58. The operation of the circuit in this case is the same as that of FIG. 2 except that the discharge rate of capacitor 36 is dependent upon current rather than voltage. Silicon diode 50 is included in this circuit; however, the Zener diode is not. The silicon diode by itself, however, will provide at least some temperature compensation.

Although the invention has been shown in connection with certain specific embodiments, it will be readily apparent to those skilled in the art that various changes in form and arrangement of parts may be made to suit requirements without departing from the spirit and scope of the invention. In this respect it will be apparent that the circuit could be readily modified to substitute a vacuum tube for the transistor shown herein.

I claim as my invention:

1. Temperature insensitive apparatus for producing a recurring pulsed output signal having a frequency which varies linearly as the magnitude of a variable electrical input quantity comprising, in combination, an electron valve having an electron emitter electrode, an electron collector electrode, and a control element connected thereto, a pair of terminals adapted for connection to a source of potential, a transformer having an input winding and an output winding across which said output signal appears, means connecting one of said terminals to one of said electrodes, means connecting the other of said terminals to said input winding intermediate its ends, a connection between the other of said electrodes and one end of said input winding, the series combination of a capacitor and a unidirectional current device connecting the other end of said input winding to said control element whereby the capacitor will become charged when current flows through the electron valve, a Zener diode connecting the other of said terminals to said other end of the input winding, a discharge path for said capacitor, and a device in said discharge path for varying the rate of discharge of said capacitor and the potential on said control electrode.

2. A frequency generator for converting analog information into digital information comprising a transistor having an emitter, a collector and a base, a pair of terminals adapted for connection to a source of direct current voltage, an output transformer having input and output windings, means connecting one of said terminals to said emitter, means connecting the other of said terminals to said input winding, a connection between said collector and one end of said input winding, a unidirectional current device and a capacitor in series connecting the other end of said input winding to said base, and means connected between the junction of said series connected capacitor and unidirectional device and said other terminal for varying the rate of discharge of said capacitor and the potential on said base, the arrangement being such that said transistor will periodically conduct to charge said capacitor and produce output pulses across said output winding, the frequency of said output pulses being controlled by the aforesaid means for varying the rate of discharge of said capacitor.

3. An essentially temperature insensitive frequency generator for converting analog information into digital information comprising a transistor having an emitter, a collector and a base, a pair of terminals adapted for connection to a source of direct current voltage, a transformer having input and output windings, means connecting one of said terminals to said emitter, means connecting the other of said terminals to said input winding, a connection between said collector and one end of said capacitor in series connecting the other end of said input winding to said base, a Zener diode having its cathode connected to said other terminal and its anode connected to said other end of the input winding, and a source of variable direct current voltage connected between the junction of said series-connected capacitor and unidirectional current device and said other terminal, the arrangement being such that said transistor will periodically conduct to charge said capacitor and produce output pulses across said output winding, the frequency of said output pulses being proportional to the magnitude of said variable direct current voltage and essentially unaffected by current variations through said transistor due to temperature changes.

4. Apparatus for producing a pulsed output signal having a frequency proportional to the magnitude of a variable electrical input quantity comprising, in combination, an electron valve having an electron emitter electrode, an electron collector electrode and a control element connected thereto, a pair of terminals adapted for connection to a source of potential, a transformer having an input winding and an output winding across which said output signal appears, means connecting one of said terminals to one of said electrodes, means connecting the other of said terminals to said input winding intermediate its ends, a connection between one end of the input winding and the other electrode of said electron valve, a current path connecting said control element to the other end of said input winding, said current path having a capacitor therein together with a unidirectional current device interposed between the capacitor and the control element, and a source of variable input voltage connected between said other terminal and the junction of said capacitor and unidirectional current device.

5. Apparatus for producing a pulsed output signal having a frequency proportional to the magnitude of a variable electrical input quantity comprising, in combination, an electron valve having an electron emitter electrode, an electron collector electrode and a control element connected thereto, a pair of terminals adapted for connection to a source of potential, a transformer having an input winding and an output winding across which said output signal appears, means connecting one of said terminals to one of said electrodes, means connecting the other of said terminals to said input winding intermediate its ends, a connection between one end of the input winding and the other electrode of said electron valve, a current path connecting said control element to the other end of said input winding, said current path having a capacitor therein together with a unidirectional current device interposed between the capacitor and the control element, a Zener diode having its anode connected to said other end of the input winding and its cathode connected to said other terminal, and a source of variable input voltage connected between said other terminal and the junction of said capacitor and unidirectional current device.

6. A frequency generator for converting analog information into digital information comprising a transistor having an emitter, a collector and a base, a pair of terminals adapted for connection to a source of direct current voltage, a transformer having input and output windings, means connecting one of said terminals to said emitter, means connecting the other of said terminals to said input winding intermediate its ends, a connection between said collector and one end of said input winding, circuit means including a capacitor connecting the other end of said input winding to said base, a Zener diode connecting said other terminal to said other end of the input winding, and circuit means connecting said base to said other terminal including a device for varying the rate of discharge of said capacitor and the potential on said base.

References Cited in the file of this patent

UNITED STATES PATENTS

| 2,791,739 | Light | May 7, 1957 |
| 2,895,081 | Crownover et al. | July 14, 1959 |

OTHER REFERENCES

Transistor Circuit Handbook by Louis E. Garner, Jr., pages 314 and 315.